United States Patent
Ahn et al.

(10) Patent No.: US 11,894,516 B2
(45) Date of Patent: Feb. 6, 2024

(54) THERMOSETTING ELECTROLYTE COMPOSITION FOR LITHIUM SECONDARY BATTERY, GEL POLYMER ELECTROLYTE PREPARED THEREFROM, AND LITHIUM SECONDARY BATTERY INCLUDING THE ELECTROLYTE

(71) Applicant: LG CHEM, LTD., Seoul (KR)

(72) Inventors: Kyoung Ho Ahn, Daejeon (KR); Jung Hoon Lee, Daejeon (KR); Won Kyung Shin, Daejeon (KR); Jae Won Lee, Daejeon (KR); Sol Ji Park, Daejeon (KR); Chul Haeng Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 617 days.

(21) Appl. No.: 17/056,317

(22) PCT Filed: Sep. 10, 2019

(86) PCT No.: PCT/KR2019/011738
§ 371 (c)(1),
(2) Date: Nov. 17, 2020

(87) PCT Pub. No.: WO2020/055110
PCT Pub. Date: Mar. 19, 2020

(65) Prior Publication Data
US 2021/0257660 A1    Aug. 19, 2021

(30) Foreign Application Priority Data

Sep. 10, 2018   (KR) .................. 10-2018-0107915

(51) Int. Cl.
*H01M 10/0565* (2010.01)
*H01M 10/0525* (2010.01)
*H01M 10/0569* (2010.01)

(52) U.S. Cl.
CPC ... *H01M 10/0565* (2013.01); *H01M 10/0525* (2013.01); *H01M 10/0569* (2013.01); *H01M 2300/0082* (2013.01); *H01M 2300/0085* (2013.01)

(58) Field of Classification Search
CPC ......... H01M 10/0525; H01M 10/0565; H01M 10/0569
See application file for complete search history.

(56) References Cited

U.S. PATENT DOCUMENTS

| | | |
|---|---|---|
| 2002/0009649 A1 | 1/2002 | Sato et al. |
| 2004/0076885 A1 | 4/2004 | Sato et al. |
| 2008/0090145 A1 | 4/2008 | Hiwara et al. |
| 2015/0243994 A1 | 8/2015 | Chu et al. |
| 2015/0243995 A1 | 8/2015 | Chu et al. |
| 2016/0028110 A1 | 1/2016 | Yu et al. |

FOREIGN PATENT DOCUMENTS

| | | |
|---|---|---|
| CN | 1337757 A | 2/2002 |
| CN | 101103070 A | 1/2008 |
| CN | 101246958 A | 8/2008 |
| EP | 1164654 A2 | 12/2001 |
| JP | 2014-063710 A | 4/2014 |
| KR | 10-2014-0035793 A | 3/2014 |
| KR | 10-2016-0052323 A | 5/2016 |
| KR | 10-2016-0142290 A | 12/2016 |
| KR | 10-2017-0032260 A | 3/2017 |
| WO | 2014/042334 A1 | 3/2014 |

OTHER PUBLICATIONS

Zhou et al., "Investigation of cyano resin-based gel polymer electrolyte: in situ gelation mechanism and electrode-electrolyte interfacial fabrication in lithium-ion battery," Journal of Materials Chemistry A, 2014, vol. 2, pp. 20059-20066.
Aji et al., "Electrical Conductivity Study of Polymer Electrolyte Magnetic Nanocomposite Based Poly(Vinyl) Alcohol (PVA) Doping Lithium and Nickel Salt," AIP conference proceedings, 2010, vol. 1284, pp. 51-54.
International Search Report (with partial translation) and Written Opinion issued in corresponding International Patent Application No. PCT/KR2019/011738, dated Dec. 23, 2019.
Office Action issued in corresponding Chinese Patent Application No. 201980030408.4 dated Jun. 7, 2023.
Extended European Search Report dated May 27, 2021 issued by the European Patent Office in a corresponding European patent application No. 19859263.6.
Oh et al., "Polymer Electrolytes Based on Poly(ethylene glycol) and Cyanoresin," Journal of Applied Polymer Science, vol. 103, No. 4, pp. 2402-2408 (2007) XP055645145.

*Primary Examiner* — Karie O'Neill Apicella

(74) *Attorney, Agent, or Firm* — Morgan, Lewis & Bockius LLP

(57) ABSTRACT

The present invention relates to a thermosetting electrolyte composition for a lithium secondary battery, a gel polymer electrolyte prepared therefrom, and a lithium secondary battery including the gel polymer electrolyte, and particularly, to a thermosetting electrolyte composition for a lithium secondary battery, which includes $LiPF_6$ as a first lithium salt, a second lithium salt excluding the $LiPF_6$, a non-aqueous organic solvent, and a polymer or oligomer containing a unit represented by Formula 1, a gel polymer electrolyte prepared therefrom, and a lithium secondary battery including the gel polymer electrolyte.

10 Claims, No Drawings

THERMOSETTING ELECTROLYTE COMPOSITION FOR LITHIUM SECONDARY BATTERY, GEL POLYMER ELECTROLYTE PREPARED THEREFROM, AND LITHIUM SECONDARY BATTERY INCLUDING THE ELECTROLYTE

CROSS-REFERENCE TO RELATED APPLICATIONS

This application claims the benefit of Korean Patent Application No. 2018-0107915, filed on Sep. 10, 2018, in the Korean Intellectual Property Office, the disclosure of which is incorporated herein in its entirety by reference.

TECHNICAL FIELD

The present invention relates to a thermosetting electrolyte composition for a lithium secondary battery, a gel polymer electrolyte prepared therefrom, and a lithium secondary battery including the gel polymer electrolyte, and more particularly, to a thermosetting electrolyte composition for a lithium secondary battery which includes a polymer or oligomer having a thermopolymerizable functional group, a gel polymer electrolyte prepared therefrom, and a lithium secondary battery including the gel polymer electrolyte.

BACKGROUND ART

Recently, there is a growing demand for high performance, high stability secondary batteries as electric, electronic, communication, and computer industries have rapidly developed. Particularly, in line with miniaturization and lightweight trends of electronic (communication) devices, thin-film and miniaturized lithium secondary batteries, as core components in this field, are required.

An electrolyte in a liquid state, for example, an ion conductive organic liquid electrolyte, in which a salt is dissolved in an organic solvent using a carbonate organic solvent as a main solvent, has been mainly used as an electrolyte in a lithium secondary battery. However, the liquid electrolyte is disadvantageous in that stability is low, for example, the possibility of volatizing the organic solvent is not only high, but a thickness of the battery also increases because gas is generated in the battery due to the decomposition of the carbonate organic solvent and/or a side reaction between the organic solvent and an electrode during charge and discharge. In particular, if this side reaction is accelerated during high-temperature storage, since the continuously generated gas causes an increase in internal pressure of the battery, it may cause a phenomenon in which a center of a predetermined surface of the battery is deformed, for example, a prismatic type battery swells in a specific direction, or is exploded. In addition, a local difference in adhesion on an electrode surface is generated to cause a problem in which an electrode reaction does not occur equally on the entire electrode surface.

Accordingly, in order to secure stability of the lithium secondary battery, research to commercialize a polymer electrolyte, such as a gel polymer electrolyte, instead of the liquid electrolyte, has recently emerged.

The gel polymer electrolyte is advantageous in that, since it has excellent electrochemical stability in comparison to the liquid electrolyte, the thickness of the battery may not only be constantly maintained, but a stable thin-film type battery may also be prepared due to the inherent adhesion of a gel phase.

A secondary battery, in which the gel polymer electrolyte is used, may be prepared by the following two methods.

First, there is a coating type method in which, after a composition for a gel polymer electrolyte in a liquid state is prepared by dissociating a polymer or a monomer having a polymerizable site with a polymerization initiator in a liquid electrolyte solution in which a salt is dissolved in a non-aqueous organic solvent, one surface or both surfaces of at least one of an electrode and a separator are coated with the composition, and gelation is performed by using heat or ultraviolet (UV) light to form a gel polymer electrolyte on the surface of the electrode or the separator.

Also, there is an injection type method in which, after the composition for a gel polymer electrolyte in a liquid state is injected into a secondary battery including an electrode assembly in which a positive electrode, a negative electrode, and a separator are wound or stacked, gelation (crosslinking) is performed under appropriate temperature and time conditions to form a gel polymer electrolyte.

With respect to the injection type method, wetting of the electrolyte solution to the electrode is improved in comparison to that of the coating type method, but the injection type method is disadvantageous in that pre-gelation occurs due to a reaction with the polymerization initiator at room temperature before the injection of the composition for a gel polymer electrolyte into the secondary battery. Thus, since wetting of the battery is reduced when the pre-gelation occurs before curing, overall performance of the battery may not only be degraded, but also the liquid injection process may not be easily performed, and, furthermore, interfacial resistance between the electrode and the separator may be increased to degrade cycle performance.

Therefore, there is a need to develop a technique for preparing a lithium secondary battery in which the wetting is improved during the preparation of the secondary battery including the gel polymer electrolyte and high performance may be achieved by preventing the side reaction caused by the polymerization initiator.

PRIOR ART DOCUMENT

Korean Patent Application Laid-open Publication No. 2014-0035793

DISCLOSURE OF THE INVENTION

Technical Problem

An aspect of the present invention provides a thermosetting electrolyte composition for a lithium secondary battery which includes a polymer or oligomer having a thermopolymerizable functional group.

Another aspect of the present invention provides a gel polymer electrolyte for a lithium secondary battery which is prepared from the thermosetting electrolyte composition.

Another aspect of the present invention provides a lithium secondary battery including the gel polymer electrolyte.

Technical Solution

According to an aspect of the present invention, there is provided a thermosetting electrolyte composition for a lithium secondary battery which includes:

$LiPF_6$ as a first lithium salt;
a second lithium salt excluding the $LiPF_6$;
a non-aqueous organic solvent; and a polymer or oligomer containing a unit represented by Formula 1 below.

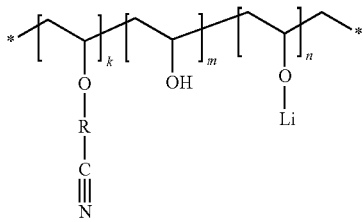

[Formula 1]

In Formula 1,
R is a substituted or unsubstituted alkylene group having 1 to 5 carbon atoms, and
k, m, and n are the numbers of repeating units,
wherein k is an integer of 10 to 15,000,
m is an integer of 10 to 30,000, and
n is an integer of 10 to 30,000.

According to another aspect of the present invention, there is provided a gel polymer electrolyte for a lithium secondary battery which is prepared by thermal polymerization of the thermosetting electrolyte composition for a lithium secondary battery of the present invention.

According to another aspect of the present invention, there is provided a lithium secondary battery including the gel polymer electrolyte of the present invention.

Advantageous Effects

Since a thermosetting electrolyte composition of the present invention includes a polymer or oligomer containing a unit represented by Formula 1 which includes a cyano group, as a thermopolymerizable functional group, a hydroxyl group, and a —OLi group at its end, a gel polymer electrolyte may be formed by heating even in the absence of a polymerization initiator, and thus, pre-gelation of the thermosetting electrolyte composition caused by the polymerization initiator may be prevented. Furthermore, in the present invention, a gel polymer electrolyte having improved impregnability and a lithium secondary battery having improved oxidation stability and capacity characteristics may be achieved by including the thermosetting electrolyte composition.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Unless otherwise specified in the present invention, the expression "*" denotes the same or different atom or a portion connected between ends of a formula.

Also, in the present specification, the expression "alkylene group" denotes a branched or unbranched divalent unsaturated hydrocarbon group. In an embodiment, the alkylene group may be substituted or unsubstituted. The alkylene group includes a methylene group, an ethylene group, a propylene group, an isopropylene group, a butylene group, an isobutylene group, a tert-butylene group, a pentylene group, and 3-pentylene group, but the alkylene group is not limited thereto.

Furthermore, in the present specification, the expression "repeating unit" denotes a monomer unit constituting a polymer.

Also, in the present specification, the expression "thermopolymerizable functional group" denotes a functional group capable of performing polymerization between the same functional groups or different functional groups by heating in the absence of a polymerization initiator.

Thermosetting Electrolyte Composition

Specifically, in an embodiment of the present invention, provided is a thermosetting electrolyte composition for a lithium secondary battery which includes:
LiPF$_6$ as a first lithium salt,
a second lithium salt excluding the LiPF$_6$,
a non-aqueous organic solvent, and
a polymer or oligomer containing a unit represented by Formula 1 below.

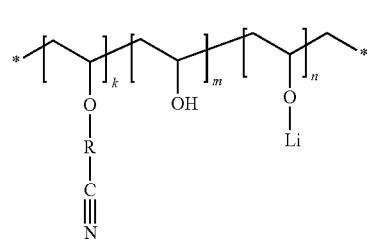

[Formula 1]

In Formula 1,
R is a substituted or unsubstituted alkylene group having 1 to 5 carbon atoms, and
k, m, and n are the numbers of repeating units,
wherein k is an integer of 10 to 15,000,
m is an integer of 10 to 30,000, and
n is an integer of 10 to 30,000.

(1) First Lithium Salt

First, the thermosetting electrolyte composition of the present invention includes LiPF$_6$ as a first lithium salt.

LiPF$_6$, as the first lithium salt, generates PF$_5^-$ while being thermally decomposed by heating during a curing process for gelation, and the generated PF$_5^-$ may act as a polymerization initiator. That is, gelation may occur while a cyano group, as a thermopolymerizable functional group contained in the compound represented by Formula 1, undergoes cationic polymerization by the PF$_5^-$ generated by the heating to form crosslinks between the polymers or oligomers containing the units represented by Formula 1.

Li$^+$ ions may be consumed while a portion of the LiPF$_6$, as the first lithium salt, participates in a polymerization reaction during thermal polymerization of the thermosetting electrolyte composition for a lithium secondary battery of the present invention. Thus, in the present invention, a second lithium salt may be further included to prevent a decrease in concentration of the Li$^+$ ions in the thermosetting electrolyte composition during the thermal polymerization.

(2) Second Lithium Salt

The second lithium salt may be used without particular limitation as long as it is a compound, excluding LiPF$_6$, capable of providing lithium ions used in a lithium secondary battery, and, as a representative example, the second lithium salt may include $Li^+$ as a cation, and may include a compound including at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, $C_6HF_6N^-$(LiTDI), and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_4$, $LiCF_3SO_3$, $LiCH_3CO_2$, $LiCF_3CO_2$, $LiAsF_6$, $LiSbF_6$, $LiCH_3SO_3$, LiTFSI (lithium (bis)trifluoromethanesulfonimide, $LiN(SO_2CF_3)_2$), LiFSI (Lithium bis(fluorosulfonyl)imide, $LiN(SO_2F)_2$), and LiBETI (lithium bisperfluoroethanesulfonimide, $LiN(SO_2CF_2CF_3)_2$, or a mixture of two or more thereof, and, in addition thereto, a lithium salt typically used in an electrolyte solution of the lithium secondary battery may be used without limitation.

The first lithium salt and the second lithium salt may be included in a molar ratio of 1:0.01 to 1:50, particularly 1:1 to 1:30, and more particularly 1:1 to 1:10.

In a case in which the molar ratio of the second lithium salt to 1 mol of the first lithium salt is less than 0.01, since a concentration of lithium ions in the thermosetting electrolyte composition is reduced to decrease mobility of the lithium ions, capacity characteristics of the lithium secondary battery may be degraded. The second lithium salt has an excellent ion-transfer effect, but may generate an amine or alkaline component due to a side reaction with moisture in the battery. Thus, if the molar ratio of the second lithium salt to 1 mol of the first lithium salt is greater than 50, a metallic component, for example, a current collector or a battery case may be corroded by the amine or alkaline component generated due to the side reaction, or a crosslinking reaction rate between the polymers or oligomers may be reduced during the thermal polymerization.

In the thermosetting electrolyte composition for a lithium secondary battery, a mixing concentration of the first lithium salt and the second lithium salt may be in a range of 0.1 M to 5 M, particularly 0.5 M to 5 M, and more particularly 1 M to 4.5 M. In a case in which the mixing concentration of the total lithium salts in the thermosetting electrolyte composition is less than 0.1 M, since ionic conductivity of the electrolyte is reduced, electrolyte performance is degraded, and, in a case in which the mixing concentration of the lithium salts is greater than 5 M, electrolyte impregnability is reduced as viscosity of the electrolyte increases, and the mobility of the lithium ions may be reduced to degrade the capacity characteristics.

(3) Non-Aqueous Organic Solvent

Various organic solvents typically used in a lithium electrolyte may be used as the non-aqueous organic solvent without limitation. For example, the organic solvent may include a cyclic carbonate-based organic solvent, a linear carbonate-based organic solvent, or a mixed organic solvent thereof.

The cyclic carbonate-based organic solvent is an organic solvent capable of well dissociating the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include at least one of ethylene carbonate and propylene carbonate (PC).

Also, the linear carbonate-based organic solvent is an organic solvent with low viscosity and low permittivity, wherein, as a representative example thereof, at least one organic solvent selected from the group consisting of dimethyl carbonate (DMC), ethylmethyl carbonate (EMC), diethyl carbonate (DEC), dipropyl carbonate, methylpropyl carbonate, and ethylpropyl carbonate may be used, and the linear carbonate-based organic solvent may be specifically include at least one of dimethyl carbonate and ethylmethyl carbonate.

In the present invention, the cyclic carbonate-based organic solvent and the linear carbonate-based organic solvent may be included in a volume ratio of 10:90 to 50:50, for example, 15:85 to 30:70 to secure high ionic conductivity.

Furthermore, the organic solvent may further include at least one organic solvent of a linear ester-based organic solvent and a cyclic ester-based organic solvent, which have a lower melting point and higher stability at high temperatures than those of the cyclic carbonate-based organic solvent and/or the linear carbonate-based organic solvent, to prepare an electrolyte solution having high ionic conductivity. Specifically, the organic solvent may further include a linear ester-based organic solvent which may reduce viscosity of the thermosetting electrolyte composition and may simultaneously increase a dissociation degree of the lithium salt by chelating lithium cations by an ether symmetric structure. In a case in which the linear ester solvent is further used, ionic conductivity of the thermosetting electrolyte composition may be further improved.

Any one selected from the group consisting of methyl acetate, ethyl acetate, propyl acetate, methyl propionate, ethyl propionate, propyl propionate, and butyl propionate or a mixture of two or more thereof may be typically used as the linear ester-based organic solvent, but the linear ester-based organic solvent is not limited thereto.

Also, the cyclic ester-based organic solvent may include at least one organic solvent selected from the group consisting of γ-butyrolactone, γ-valerolactone, γ-caprolactone, σ-valerolactone, and ε-caprolactone.

(4) Polymer or Oligomer Containing Unit Represented by Formula 1

The thermosetting electrolyte composition for a lithium secondary battery of the present invention includes a polymer or oligomer containing a unit represented by Formula 1, which has a thermopolymerizable functional group, so as to perform polymerization by heating in the absence of a

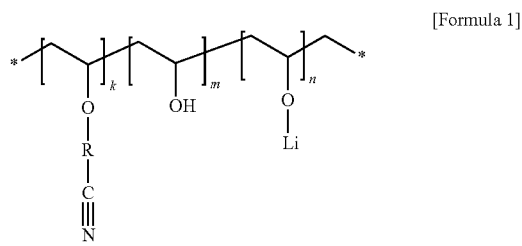

[Formula 1]

In Formula 1,

R is a substituted or unsubstituted alkylene group having 1 to 5 carbon atoms, and k, m, and n are the numbers of repeating units,
wherein k is an integer of 10 to 15,000,
m is an integer of 10 to 30,000, and
n is an integer of 10 to 30,000.

Since the polymer or oligomer containing the unit represented by Formula 1 contains a cyano group (CN) as a thermopolymerizable functional group at its end, a cross-linking polymerization reaction occurs at room temperature (25° C.±10° C.), for example, at a temperature of 40° C. or more, specifically, 60° C. or more even without a separate polymerization initiator, and thus, gelation occurs. That is, when anions, for example, $PF_5^-$ are generated from $LiPF_6$, as the first lithium salt, present in the electrolyte solution by the heat treatment, the $PF_5^-$ reacts with $H_2O$ remaining in the electrolyte solution to form $H^+F(PF_5OH)^-$. The $H^+F(PF_5OH)^-$ is bonded to the cyano group (—CN) of the polymer or oligomer containing the unit represented by Formula 1 to form a $HN=C^+(PF_5OH)^-$ group, and, while repeating a process of forming a crosslink between the $HN=C^+(PF_5OH)^-$ group and a cyano group (—CN) of another polymer or oligomer containing the unit represented by Formula 1, a gel polymer electrolyte may be prepared by performing polymerization by heating even if a separate polymerization initiator is not included.

Since sufficient mechanical strength may not only be secured, but a gel polymer electrolyte having improved adhesion between an electrode and a separator may also be formed by the polymerization, an effect of improving thermal stability of the secondary battery may be achieved even in a high-temperature storage environment, such as a hot box test, by preventing the separator from shrinking at high temperature exposure.

Furthermore, with respect to a gel polymer electrolyte including a conventional polymerization initiator, a trace amount of $N_2$ gas is generated from the polymerization initiator while the polymerization initiator generates radicals, and, in a case in which the gas thus generated remains in the gel polymer electrolyte, since the formation of a non-uniform film is caused, resistance may be increased and precipitation of lithium dendrites may occur. Also, since the polymerization initiator remaining after the generation of the radicals remains in the polymer matrix in the gel polymer electrolyte after the reaction, it may cause an increase in resistance.

Since a polymerization initiator is not included as a thermosetting electrolyte composition component in the present invention, a pre-gelation reaction of the composition, which has occurred during the preparation of a conventional gel polymer electrolyte, may not only be effectively prevented, but problems, such as the $N_2$ gas generation and the increase in the resistance due to the remaining polymerization initiator, may also be improved. Particularly, in a case in which a gel polymer electrolyte prepared from the thermosetting electrolyte composition of the present invention is used in a secondary battery including a positive electrode containing Ni-rich transition metal oxide, since a polymer matrix is formed in which adhesion between the gel polymer electrolyte and the positive electrode is strongly maintained during high-temperature exposure, a direct side reaction of the electrolyte with an $O_2$ or O radical generated by the collapse of a positive electrode structure during the high-temperature exposure is prevented to reduce a calorific value, and thus, thermal runaway may be suppressed. Therefore, the thermosetting electrolyte composition of the present invention and the gel polymer electrolyte prepared therefrom may further improve high-temperature stability of the secondary battery including the positive electrode containing Ni-rich transition metal oxide.

Furthermore, since the polymer or oligomer containing the unit represented by Formula 1 of the present invention contains —OLi as an end group in a structure, an amount of lithium (Li) on a surface of the electrode may be maintained at a predetermined level. Thus, a battery performance may be further improved by improving ionic conductivity at an interface between the electrode and the separator. That is, since the polymer or oligomer containing the unit represented by Formula 1 of the present invention further contains a repeating unit containing —OLi as an end group in the structure in comparison to a compound represented by the following Formula 3 which typically contains a cyano group and a —OH group as end groups, a crosslinking reaction in the form of ionic polymerization may be further performed, and thus, the polymerization reaction may be more easily performed even without a polymerization initiator in the battery. In addition, since a Li-ion concentration on the surface of the electrode may be constantly maintained and secured, a concentration polarization phenomenon generated during high-rate charge and discharge of a secondary battery using a thick electrode may be solved to some extent.

[Formula 3]

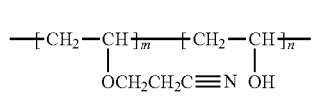

In Formula 1, R is a substituted or unsubstituted alkylene group having 1 to 3 carbon atoms, and R may be more specifically —$CH_2CH_2$—.

In Formula 1, k may be an integer of 10 to 10,000, particularly an integer of 100 to 5,000, and more particularly an integer of 100 to 1,000. More specifically in Formula 1, k may be an integer of 130 to 500.

In Formula 1, m may be an integer of 10 to 15,000, particularly an integer of 100 to 10,000, and more particularly an integer of 100 to 5,000. More specifically in Formula 1, m may be an integer of 150 to 500.

In Formula 1, n may be an integer of 10 to 15,000, particularly an integer of 500 to 10,000, and more particularly an integer of 500 to 5,000. More specifically in Formula 1, n may be an integer of 1,500 to 5,000.

Also, in Formula 1, a molar ratio of the repeating unit k:(the repeating unit m+the repeating unit n) may be in a range of 1:0.001 to 1:1, particularly 1:0.01 to 1:1, more particularly 1:0.05 to 1:0.9, for example, 1:0.1 to 1:0.7.

If, in Formula 1, the molar ratio of the repeating unit (m+n) to 1 mol of the repeating unit k is less than 0.001, since lithium-ion transfer efficiency is not only reduced but a crosslinking reaction rate for gelation is also reduced, it is difficult to form a stable gel polymer electrolyte. Also, since the adhesion between the electrode and the separator is reduced, an effect of improving stability against thermal, mechanical, and electrical shock may be insignificant. Furthermore, in Formula 1, if the molar ratio of the repeating unit (m+n) to 1 mol of the repeating unit k is greater than 1, since phase stability with the electrolyte solution is reduced, it is difficult to form a uniform gel polymer electrolyte, and thus, cell performance may be degraded.

Furthermore, in Formula 1, a molar ratio of the repeating unit m:the repeating unit n may be in a range of 1:0.1 to 1:10, particularly 1:0.5 to 1:9, and more particularly 1:0.5 to 1:7.

In Formula 1, in a case in which the molar ratio of the repeating unit n to 1 mol of the repeating unit m is less than 0.1, since the Li-ion concentration is relatively reduced, the lithium-ion transfer efficiency may be reduced. Also, in a case in which the molar ratio of the repeating unit n to 1 mol of the repeating unit m is greater than 10, since the crosslinking reaction rate for gelation is reduced while a ratio of the repeating unit including a —OH group as an end group is relatively reduced, it is difficult to form a stable gel polymer electrolyte.

A weight-average molecular weight (Mw) of the polymer or oligomer containing the unit represented by Formula 1 may be controlled by the number of repeating units, and may be in a range of 1,500,000 g/mol or less, particularly 5,000 g/mol to 500,000 g/mol, and more particularly 5,000 g/mol to 400,000 g/mol.

In a case in which the weight-average molecular weight of the polymer or oligomer is within the above range, the crosslinking reaction may be performed by heating even without a polymerization initiator at a temperature of 60° C. or more, and, simultaneously, impregnability of the thermosetting electrolyte composition may be improved by controlling the viscosity of the thermosetting electrolyte composition. In a case in which the weight-average molecular weight of the polymer or oligomer containing the unit represented by Formula 1 is in a range of 5,000 g/mol to 400,000 g/mol, electrolyte solution wetting to the electrode and the separator may be further improved.

The weight-average molecular weight of the polymer or oligomer containing the unit represented by Formula 1 may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated from the results obtained using an analytical method (system: Alliance 4, column: PL mixed B column by Agilent Technologies, eluent: tetrahydrofuran (THF), flow rate: 0.1 mL/min, temp: 40° C., injection: 100 μL).

Also, viscosity (electrolyte solution solvent, 20%, 25° C.) of the polymer or oligomer containing the unit represented by Formula 1 may be in a range of 4.0 cPs to 100 cPs, for example, 4.0 cPs to 20 cPs.

In a case in which the viscosity of the polymer or oligomer containing the unit represented by Formula 1 is within the above range, impregnation characteristics of the electrolyte solution may be more easily secured. In this case, since it is difficult to secure wetting to a large-area and thick electrode when the viscosity of the polymer or oligomer containing the unit represented by Formula 1 is 100 cPs or more, it is desirable that the viscosity of the polymer or oligomer is 100 cPs or less in order to secure the impregnability of the electrolyte solution over a certain range.

After the polymer or oligomer containing the unit represented by Formula 1 was dissolved in the electrolyte solution solvent used at a concentration of 3 wt %, the viscosity was measured at 25° C. with a LV DV-II+ Pro viscometer (cone-plate type) by Brookfield, and, during the measurement, a spindle was S40, an rpm was 15, and a sample loading amount was 1 mL.

The polymer or oligomer containing the unit represented by Formula 1 may be included in an amount of less than 25 wt %, particularly 0.1 wt % to 20 wt %, and more particularly 0.3 wt % to 10 wt %, for example, 0.5 wt % to 5 wt % based on a total weight of the thermosetting electrolyte composition for a lithium secondary battery.

If the amount of the polymer or oligomer containing the unit represented by Formula 1 is 0.1 wt % or more, particularly, 0.3 wt % or more, since a gel-forming effect may not only be improved to secure sufficient mechanical strength of the gel polymer electrolyte, but a gel polymer electrolyte capable of effectively controlling a side reaction with a positive electrode is also formed, safety may be improved. Also, if the amount of the polymer or oligomer containing the unit represented by Formula 1 is less than 25 wt %, for example, 20 wt % or less, a side reaction and an increase in resistance due to the excessive amount of the polymer or oligomer may be prevented, and wetting properties of the thermosetting electrolyte composition may be improved. For example, if the amount of the polymer or oligomer in the thermosetting electrolyte composition is 25 wt % or more, it is not only difficult to measure the presence of pre-gelation due to phase non-uniformity, but ionic conductivity is also reduced while the viscosity increases, and thus, degradation of battery operation performance is caused.

(5) Additional Additives

In order to prevent a non-aqueous electrolyte solution from being decomposed to cause collapse of a negative electrode in a high output environment, or further improve low-temperature high-rate discharge characteristics, high-temperature stability, overcharge protection, and a battery swelling suppression effect at high temperatures, the thermosetting electrolyte composition of the present invention may further include additional additives, if necessary.

Examples of the additional additive may be at least one selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound, for example, may include vinylene carbonate (VC) or vinyl ethylene carbonate.

The halogen-substituted carbonate-based compound, for example, may include fluoroethylene carbonate (FEC).

The sultone-based compound, for example, may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may include ethylene sulfate (Esa), trimethylene sulfate (TMS), or methyl trimethylene sulfate (MTMS).

The phosphate-based compound, for example, may include at least one compound selected from the group consisting of lithium difluoro bis(oxalato)phosphate, lithium difluorophosphate, lithium tetrafluoro(oxalato)phosphate, trimethylsilyl phosphite, tris(2,2,2-trifluoroethyl)phosphate, and tris(trifluoroethyl)phosphite.

The borate-based compound, for example, may include tetraphenylborate and lithium oxalyldifluoroborate.

The nitrile-based compound, for example, may include at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound, for example, may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis(oxalato)borate ($LiB(C_2O_4)_2$)), and $LiBF_4$.

In a case in which vinylene carbonate, vinyl ethylene carbonate, or succinonitrile, among these additional additives, is included, a more robust solid electrolyte interface (SEI) may be formed on a surface of the negative electrode during an initial activation process of the secondary battery.

In a case in which $LiBF_4$ is included, high-temperature stability of the secondary battery may be improved by suppressing the generation of gas which may be generated due to the decomposition of the electrolyte solution during high-temperature storage.

The additional additives may be used as a mixture of two or more thereof, and may be included in an amount of 0.01 wt % to 10 wt %, particularly 0.01 wt % to 8 wt %, and preferably 0.05 wt % to 5 wt % based on a total weight of the non-aqueous electrolyte solution. If the amount of the additional additive is less than 0.01 wt %, effects of improving low-temperature output, high-temperature storage characteristics, and high-temperature life characteristics of the battery are insignificant, and, if the amount of the additional additive is greater than 10 wt %, there is a possibility that the side reaction occurs excessively during charge and discharge of the battery due to the excessive amount of the additive. Particularly, since the additives for forming an SEI may not be sufficiently decomposed at high temperatures when excessive amounts of the additives for forming an SEI are added, an unreacted material may be formed in the electrolyte solution at room temperature, or the additives for forming an SEI may be present in the form of precipitates. Accordingly, a side reaction may occur in which life or resistance characteristics of the secondary battery are degraded.

Gel Polymer Electrolyte

Also, in the present invention, a gel polymer electrolyte for a lithium secondary battery, which is formed by thermal polymerization of the thermosetting electrolyte composition for a lithium secondary battery in an inert atmosphere, may be provided.

Specifically, after injecting the thermosetting electrolyte composition into the secondary battery, the gel polymer electrolyte may be prepared by curing the thermosetting electrolyte composition by thermal polymerization.

For example, the gel polymer electrolyte may be formed by in-situ polymerization of the thermosetting electrolyte composition in the secondary battery.

An in-situ polymerization reaction in the lithium secondary battery may be performed by using electron beam (E-beam), γ-ray, and room temperature or high temperature aging processes, and, according to an embodiment of the present invention, the in-situ polymerization reaction may be performed by thermal polymerization. In this case, polymerization time required may be in a range of about 2 minutes to about 48 hours, and the thermal polymerization may be performed in a temperature range of 60° C. to 100° C., for example, 60° C. to 80° C.

Lithium Secondary Battery

Furthermore, in the present invention, a lithium secondary battery including the gel polymer electrolyte of the present invention is provided.

The lithium secondary battery of the present invention may be prepared by a method including the steps of: (a) accommodating an electrode assembly formed by sequentially stacking a positive electrode, a separator, and a negative electrode in a battery case; (b) injecting the thermosetting electrolyte composition for a lithium secondary battery of the present invention into the battery case; and (c) performing a heat treatment on the thermosetting electrolyte composition at 60° C. to 100° C. to prepare a gel polymer electrolyte.

In this case, the performing of the heat treatment may be performed for about 2 minutes to about 48 hours, for example, 1 hour to 24 hours, and the thermal polymerization temperature may be more specifically in a range of 60° C. to 80° C.

Also, the method may further include a step of activating, before or after the heat treatment after the injecting of the electrolyte composition for a lithium secondary battery.

The activating is a step of forming an SEI (Solid Electrolyte Interface) on the surface of the negative electrode by partial charging and discharging, wherein it may be performed by a method known in the art, and, specifically, for example, charge and discharge may be performed once or repeatedly in a predetermined range of constant current or constant voltage. Specifically, charge and discharge may be performed once in a voltage range of 2.5 V to 4.8 V. Furthermore, charge for the activation may be performed in a state of charge (SOC) range of 30% to 70%.

The method may further include aging after the activating.

The aging stabilizes the battery activated as described above by allowing the battery to be left standing for a predetermined period of time, wherein the aging may be performed at 19° C. to 25° C.

Those prepared by typical methods and used in the preparation of the lithium secondary battery may all be used without particular limitation as the positive electrode, the negative electrode, and the separator which are used in the lithium secondary battery of the present invention.

(1) Positive Electrode

The positive electrode may be prepared by forming a positive electrode material mixture layer on a positive electrode collector. The positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

In terms of the improvement of capacity characteristics and stability of the battery, the positive electrode active material may include a lithium composite transition metal oxide in which an amount of nickel, among transition metals, is 50 atm % or more, for example, 70 atm % or more.

As a representative example, the positive electrode active material may include a lithium nickel cobalt manganese-based oxide such as $LiNi_{0.5}Co_{0.2}Mn_{0.3}O_2$, $LiNi_{0.5}Co_{0.3}Mn_{0.2}O_2$, $LiNi_{0.6}Co_{0.2}Mn_{0.2}O_2$, or $LiNi_{0.8}Co_{0.1}Mn_{0.1}O_2$.

In addition, the positive electrode active material is a compound capable of reversibly intercalating and deintercalating lithium, wherein lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., etc.), lithium-nickel-manganese-based oxide (e.g., $LiNi_{1-y}Mn_yO_2$ (where 0<Y<1), LiMn$_{2-o}$Ni$_o$O$_4$ (where 0<O<2), etc.), lithium-nickel-cobalt-based oxide (e.g., LiNi$_{1-Y1}$Co$_{Y1}$O$_2$ (where 0<Y1<1), lithium-manganese-cobalt-based oxide (e.g., LiCo$_{1-Y2}$Mn$_{Y2}$O$_2$ (where 0<Y2<1), LiMn$_{2-Z1}$Co$_{Z1}$O$_4$ (where 0<Z1<2), etc.), lithium-nickel-cobalt-transition metal (M) oxide (e.g., Li(Ni$_{p2}$Co$_{q2}$Mn$_{r3}$M$_{S2}$)O$_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), or a compound containing a sulfur material capable of being charged and discharged by phase transition may also be used.

The positive electrode active material may be included in an amount of 80 wt % to 99.5 wt %, for example, 85 wt % to 95 wt % based on a total weight of solid content in the positive electrode slurry. In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene termonomer (EPDM), a sulfonated EPDM, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

(2) Negative Electrode

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, nickel metal, copper metal, SUS metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, PbO$_2$, Pb$_2$O$_3$, Pb$_3$O$_4$, Sb$_2$O$_3$, Sb$_2$O$_4$, Sn$_2$O$_5$, GeO, GeO$_2$, Bi$_2$O$_3$, Bi$_2$O$_4$, Bi$_2$O$_5$, Li$_x$Fe$_2$O$_3$ (0≤x≤1), Li$_x$WO$_2$ (0≤x≤1), and Sn$_x$Me$_{1-x}$Me'$_y$O$_z$ (Me: manganese (Mn), Fe, Pb, or Ge; Me': Al, boron (B), phosphorus (P), Si, Groups I, II and III elements of the periodic table, or halogen; 0<x≤1; 1≤y≤3; 1≤z≤8) may be used as the metal composite oxide.

The material, which may be doped and undoped with lithium, may include Si, SiO$_x$ (0<x≤2), a Si—Y alloy (where Y is an element selected from the group consisting of alkali metal, alkaline earth metal, a Group 13 element, a Group 14 element, transition metal, a rare earth element, and a combination thereof, and is not Si), Sn, SnO$_2$, and Sn-Y (where Y is an element selected from the group consisting of alkali metal, alkaline earth metal, a Group 13 element, a Group 14 element, transition metal, a rare earth element, and a combination thereof, and is not Sn), and a mixture of SiO$_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, or thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content including the negative electrode active material as well as selectively the binder and the conductive agent is in a range of 50 wt % to 75 wt %, for example, 50 wt % to 65 wt %.

(3) Separator

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 µm to 50 µm and a porosity of 5% to 95%. Also, the porous separator may generally have a thickness of 5 µm to 300 µm.

A shape of the lithium secondary battery of the present invention is not particularly limited, but a cylindrical type using a can, a prismatic type, a pouch type, or a coin type may be used.

EXAMPLES

Example 1

(Thermosetting Electrolyte Composition Preparation)

After $LiPF_6$ and LiFSi ($LiN(SO_2F)_2$) were dissolved in 94 g of a non-aqueous organic solvent, in which ethylene carbonate (EC) and dimethyl carbonate (DMC) were mixed in a volume ratio of 15:85, such that a concentration of each of the $LiPF_6$ and the LiFSi was 1.0 M, a thermosetting electrolyte composition was prepared by adding 5.0 g of a polymer containing the unit represented by Formula 1 (R was $—CH_2—CH_2—$, k: 84 mol, m: 14 mol, n: 2 mol, weight-average molecular weight (Mw): 61,000) and 1.0 g of vinylene carbonate (VC).

(Electrode Assembly Preparation)

A positive electrode active material ($Li(Ni_{0.8}Mn_{0.1}Co_{0.1})O_2$), a conductive agent (carbon black), and a binder (polyvinylidene fluoride: PVDF) were added in a weight ratio of 94:3:3 to N-methyl-2-pyrrolidone (NMP), as a solvent, to prepare a positive electrode active material slurry (solid content 48 wt %). A 100 µm thick positive electrode collector (aluminum (Al) thin film) was coated with the positive electrode active material slurry and dried, and the coated positive electrode collector was then roll-pressed to prepare a positive electrode.

A negative electrode active material (carbon powder), a binder (PVDF), and a conductive agent (carbon black) were added in a weight ratio of 96:3:1 to NMP, as a solvent, to prepare a negative electrode active material slurry (solid content: 70 wt %). A 90 µm thick negative electrode collector (copper (Cu) thin film) was coated with the negative electrode active material slurry and dried, and the coated negative electrode collector was then roll-pressed to prepare a negative electrode.

An electrode assembly was prepared by sequentially stacking the positive electrode, the negative electrode, and a separator formed of three layers of polypropylene/polyethylene/polypropylene (PP/PE/PP).

(Secondary Battery Preparation)

After an electrode assembly was prepared by a conventional method of sequentially stacking the positive electrode and negative electrode prepared by the above-described methods with a porous polyethylene film, the electrode assembly was accommodated in a pouch-type secondary battery case, the above-prepared thermosetting electrolyte composition was injected thereinto, and a heat treatment was performed at 60° C. for 1 hour to prepare a lithium secondary battery including a gel polymer electrolyte.

Example 2

A lithium secondary battery including a gel polymer electrolyte was prepared in the same manner as in Example 1 except that, after $LiPF_6$ and LiFSi ($LiN(SO_2F)_2$) were dissolved in 94 g of a non-aqueous organic solvent such that a concentration of each of the $LiPF_6$ and the LiFSi was 1.0 M, a thermosetting electrolyte composition was prepared by adding 5.0 g of a polymer containing the unit represented by Formula 1 (R was —$CH_2$—$CH_2$—, k: 73 mol, m: 21 mol, n: 6 mol, weight-average molecular weight (Mw): 65,000) and 1.0 g of vinylene carbonate (VC).

Example 3

A lithium secondary battery including a gel polymer electrolyte was prepared in the same manner as in Example 1 except that, after $LiPF_6$ and LiFSi ($LiN(SO_2F)_2$) were dissolved in 94 g of a non-aqueous organic solvent such that a concentration of each of the $LiPF_6$ and the LiFSi was 1.0 M, a thermosetting electrolyte composition was prepared by adding 5.0 g of a polymer containing the unit represented by Formula 1 (R was —$CH_2$—$CH_2$—, k: 86 mol, m: 8 mol, n: 6 mol, weight-average molecular weight (Mw): 62,000) and 1.0 g of vinylene carbonate (VC).

Example 4

A lithium secondary battery including a gel polymer electrolyte was prepared in the same manner as in Example 1 except that, after $LiPF_6$ and LiFSi ($LiN(SO_2F)_2$) were dissolved in 98.5 g of a non-aqueous organic solvent such that a concentration of each of the $LiPF_6$ and the LiFSi was 1.0 M, a thermosetting electrolyte composition was prepared by adding 0.5 g of a polymer containing the unit represented by Formula 1 (R was —$CH_2$—$CH_2$—, k: 84 mol, m: 14 mol, n: 2 mol, weight-average molecular weight (Mw): 61,000) and 1 g of vinylene carbonate (VC) as an additive.

Example 5

A lithium secondary battery including a gel polymer electrolyte was prepared in the same manner as in Example 1 except that, after $LiPF_6$ and LiFSi ($LiN(SO_2F)_2$) were dissolved in 98.5 g of a non-aqueous organic solvent such that a concentration of each of the $LiPF_6$ and the LiFSi was 1.0 M, a thermosetting electrolyte composition was prepared by adding 0.5 g of a polymer containing the unit represented by Formula 1 (R was —$CH_2$—$CH_2$—, k: 72 mol, m: 25 mol, n: 3 mol, weight-average molecular weight (Mw): 65,000) and 1 g of vinylene carbonate (VC) as an additive.

Example 6

A lithium secondary battery including a gel polymer electrolyte was prepared in the same manner as in Example 1 except that, after $LiPF_6$ and LiFSi ($LiN(SO_2F)_2$) were dissolved in 98.5 g of a non-aqueous organic solvent such that a concentration of each of the $LiPF_6$ and the LiFSi was 1.0 M, a thermosetting electrolyte composition was prepared by adding 0.5 g of a polymer containing the unit represented by Formula 1 (R was —$CH_2$—$CH_2$—, k: 86 mol, m: 8 mol, n: 6 mol, weight-average molecular weight (Mw): 62,000) and 1.0 g of vinylene carbonate (VC).

Example 7

A lithium secondary battery including a gel polymer electrolyte was prepared in the same manner as in Example 1 except that, after $LiPF_6$ and LiFSi ($LiN(SO_2F)_2$) were dissolved in 94 g of a non-aqueous organic solvent such that a concentration of each of the $LiPF_6$ and the LiFSi was 1.0 M, a thermosetting electrolyte composition was prepared by adding 5.0 g of a polymer containing the unit represented by Formula 1 (R was —$CH_2$—$CH_2$—, k: 30 mol, m: 60 mol, n: 5 mol, weight-average molecular weight (Mw): 61,000) and 1.0 g of vinylene carbonate (VC) as an additive.

Comparative Example 1

A lithium secondary battery including a gel polymer electrolyte was prepared in the same manner as in Example 1 except that, after $LiPF_6$ and LiFSi ($LiN(SO_2F)_2$) were dissolved in 94 g of a non-aqueous organic solvent such that a concentration of each of the $LiPF_6$ and the LiFSi was 1.0 M, a thermosetting electrolyte composition was prepared by adding 5.0 g of a compound represented by the following Formula 2 (q2=10, r2=25, s2=65, weight-average molecular weight (Mw): 55,000) and 1.0 g of vinylene carbonate (VC).

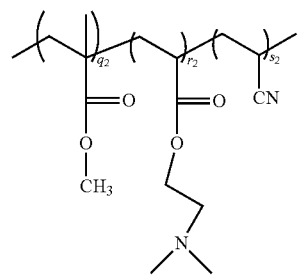

[Formula 2]

Comparative Example 2

A lithium secondary battery including a gel polymer electrolyte was prepared in the same manner as in Example 1 except that, after $LiPF_6$ and LiFSi ($LiN(SO_2F)_2$) were dissolved in 94 g of a non-aqueous organic solvent such that a concentration of each of the $LiPF_6$ and the LiFSi was 1.0 M, a thermosetting electrolyte composition was prepared by adding 5.0 g of a compound represented by the following Formula 3 (m=71, n=29, weight-average molecular weight (Mw): 64,000) and 1.0 g of vinylene carbonate (VC).

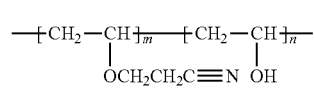

[Formula 3]

Comparative Example 3

(Preparation of Non-Aqueous Electrolyte Solution)

After $LiPF_6$ and LiFSi ($LiN(SO_2F)_2$) were dissolved in 99 g of a non-aqueous organic solvent such that a concentration of each of the $LiPF_6$ and the LiFSi was 1.0 M, a non-aqueous electrolyte solution was prepared by adding 1.0 g of vinylene carbonate (VC) as an additive.

(Electrode Assembly Preparation)

A positive electrode active material ($Li(Ni_{0.8}Mn_{0.1}Co_{0.1})O_2$; NCM), a conductive agent (carbon black), and a binder (polyvinylidene fluoride: PVDF) were added in a weight ratio of 94:3:3 to N-methyl-2-pyrrolidone (NMP), as a solvent, to prepare a positive electrode active material slurry (solid content 48 wt %). A 100 μm thick positive electrode collector (aluminum (Al) thin film) was coated with the positive electrode active material slurry and dried, and the coated positive electrode collector was then roll-pressed to prepare a positive electrode.

A negative electrode active material (carbon powder), a binder (PVDF), and a conductive agent (carbon black) were added in a weight ratio of 96:3:1 to NMP, as a solvent, to prepare a negative electrode active material slurry (solid content: 70 wt %). A 90 μm thick negative electrode collector (copper (Cu) thin film) was coated with the negative electrode active material slurry and dried, and the coated negative electrode collector was then roll-pressed to prepare a negative electrode.

An electrode assembly was prepared by sequentially stacking the positive electrode, the negative electrode, and a separator formed of three layers of polypropylene/polyethylene/polypropylene (PP/PE/PP).

(Secondary Battery Preparation)

After an electrode assembly was prepared by a conventional method of sequentially stacking the positive electrode and negative electrode prepared by the above-described methods with a porous polyethylene film, the electrode assembly was accommodated in a pouch-type secondary battery case, and the above-prepared non-aqueous electrolyte solution was injected thereinto to prepare a lithium secondary battery.

Comparative Example 4

(Electrolyte Composition Preparation)

A lithium secondary battery including a gel polymer electrolyte was prepared in the same manner as in Example 1 except that, after $LiPF_6$ and LiFSi ($LiN(SO_2F)_2$) were dissolved in 94.95 g of a non-aqueous organic solvent such that a concentration of each of the $LiPF_6$ and the LiFSi was 1.0 M, a composition for a gel polymer electrolyte was prepared by adding 5 g of an oligomer represented by the following Formula 4 (weight-average molecular weight: 4,000) and 0.05 g of a polymerization initiator (AIBN).

[Formula 4]

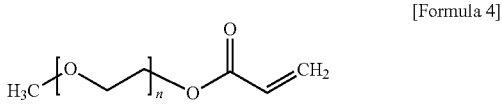

TABLE 1

| | Organic solvent | | Lithium salt | | | Polymer | | | | | | |
|---|---|---|---|---|---|---|---|---|---|---|---|---|
| | Type | Amount added (g) | First lithium salt | Second lithium salt | Mixing concentration | Formula | Repeating unit k mol | Repeating unit m mol | Repeating unit n mol | Molar ratio of k:(m + n) | Weight-average molecular weight (Mw) | Amount added (g) | Additional additive (g) |
| Example 1 | EC:DMC = 15:85 | 94 | $LiPF_6$ | LiFSI | 2.0M | 1 | 84 | 14 | 2 | 1:0.19 | 61,000 | 5 | 1 |
| Example 2 | EC:DMC = 15:85 | 94 | $LiPF_6$ | LiFSI | 2.0M | 1 | 73 | 21 | 6 | 1:0.37 | 65,000 | 5 | 1 |
| Example 3 | EC:DMC = 15:85 | 94 | $LiPF_6$ | LiFSI | 2.0M | 1 | 86 | 8 | 6 | 1:0.16 | 62,000 | 5 | 1 |
| Example 4 | EC:DMC = 15:85 | 98.5 | $LiPF_6$ | LiFSI | 2.0M | 1 | 84 | 14 | 2 | 1:0.19 | 61,000 | 0.5 | 1 |
| Example 5 | EC:DMC = 15:85 | 98.5 | $LiPF_6$ | LiFSI | 2.0M | 1 | 72 | 25 | 3 | 1:0.39 | 65,000 | 0.5 | 1 |
| Example 6 | EC:DMC = 15:85 | 98.5 | $LiPF_6$ | LiFSI | 2.0M | 1 | 86 | 8 | 6 | 1:0.16 | 62,000 | 0.5 | 1 |
| Example 7 | EC:DMC = 15:85 | 94 | $LiPF_6$ | LiFSI | 2.0M | 1 | 30 | 65 | 5 | 1:2.33 | 61,000 | 5 | 1 |
| Comparative Example 1 | EC:DMC = 15:85 | 94 | $LiPF_6$ | LiFSI | 2.0M | 2 | — | — | — | — | 55,000 | 5 | 1 |
| Comparative Example 2 | EC:DMC = 15:85 | 94 | $LiPF_6$ | LiFSI | 2.0M | 3 | — | — | — | — | 64,000 | 5 | 1 |
| Comparative Example 3 | EC:DMC = 15:85 | 94 | $LiPF_6$ | LiFSI | 2.0M | — | — | — | — | — | — | — | 1 |
| Comparative Example 4 | EC:DMC = 15:85 | 94.95 | $LiPF_6$ | LiFSI | 2.0M | 4 | — | — | — | — | 4,000 | 5 | — |

Experimental Examples

Experimental Example 1. Measurement of the Presence of Pre-Gelation at Room Temperature The thermosetting electrolyte compositions prepared in Examples 1 to 6 and 8 and the electrolyte composition of Comparative Example 4 were respectively put in vials in a glove box having an inner temperature of 25° C., the inside of each vial was filled with argon (Ar) gas, the presence of pre-gelation at room temperature was then observed for the electrolyte compositions while each vial was left standing at room temperature (25° C.±5° C.) for about 5 days, and the results thereof are presented in Table 2 below.

Subsequently, after the vials were subjected to a thermal polymerization reaction at 65° C. for 5 hours, polymerization reactivity (whether or not a gel was formed) was visually observed, and the results thereof are presented in Table 2 below.

The presence of pre-gelation at room temperature may be determined by measuring a degree of gelation of the electrolyte compositions. That is, if the gelation of the electrolyte composition proceeds, viscosity of the electrolyte composition increases and transparency decreases. Thus, the measurement of the degree of gelation may be performed by measurement of the viscosity of the electrolyte composition and observation of the transparency. The measurement of the viscosity may be performed by using a common viscosity measurement device, and the transparency may be measured by visual observation. In this case, the degree of gelation is evaluated with two grades, "no gelation" or "gelation", wherein the "no gelation" denotes a case where there is no change in the viscosity beyond the error range of the viscosity measurements, and a change in the transparency is not observed, and the "gelation" denotes a case where there is a change in the viscosity beyond the error range of the viscosity measurements, or a change in the transparency is observed.

TABLE 2

|  | After being left standing for 5 days at 25 ± 5° C. (before polymerization reaction) | | | After thermal polymerization reaction at 60° C. |
| --- | --- | --- | --- | --- |
|  | 1 day | 3 days | 5 days |  |
| Example 1 | x | x | x | ○ |
| Example 2 | x | x | x | ○ |
| Example 3 | x | x | x | ○ |
| Example 4 | x | x | x | ○ |
| Example 5 | x | x | x | ○ |
| Example 6 | x | x | x | ○ |
| Comparative Example 4 | x | ◆ | ○ | ○ |

○: complete gel formation (gelation)
◆: moderate gelation, a state in which a liquid and a gel are mixed
x: a gel is not formed (no gelation)

Referring to Table 2, with respect to the thermosetting electrolyte compositions of Examples 1 to 6 of the present invention, it may be confirmed that gelation did not proceed when the thermosetting electrolyte compositions were left standing at room temperature, but the gelation occurred after the polymerization reaction. In contrast, it may be understood that pre-gelation of the composition for a gel polymer electrolyte of Comparative Example 4 including the polymerization initiator occurred when being left standing at room temperature before the curing (heating) reaction.

From these results, it may be understood that pre-gelation of the thermosetting electrolyte composition of the present invention did not occur during injection and wetting processes, but the crosslinking polymerization occurred during the heating for the preparation of the gel polymer electrolyte. Thus, since the pre-gelation did not proceed at room temperature when the thermosetting electrolyte composition of the present invention was used, wettability may be improved.

Experimental Example 2. Electrochemical Stability Evaluation

Electrochemical (oxidation) stabilities of the secondary batteries prepared in Examples 1 to 3 and 7 and the secondary batteries prepared in Comparative Examples 1 to 3 were measured using linear sweep voltammetry (LSV). The measurement was made by using a potentiostat (EG&G, model 270A) under a three-electrode system (working electrode: platinum disk, counter electrode: platinum, reference electrode: lithium metal), and measurement temperature was 60° C. The results thereof are presented in Table 3 below.

Experimental Example 3. 0.5C Discharge Capacity Evaluation

After the lithium secondary batteries prepared by Examples 1 to 7 and Comparative Examples 1 and 2 were respectively fully charged (SOC 100%) at 0.1 C rate to 4.2 V at room temperature (25° C.) under a constant current/constant voltage condition, and discharged at 0.5 C rate to 2.5 V under a constant current condition, initial discharge capacity at 0.5 C was measured using PNE-0506 charge/discharge equipment (manufacturer: PNE solution). The results thereof are presented in Table 3 below.

TABLE 3

|  | Oxidation stability (V) | Initial discharge capacity (mAh/g) |
| --- | --- | --- |
| Example 1 | 5.6 | 98.8 |
| Example 2 | 5.3 | 97.5 |
| Example 3 | 5.7 | 99.5 |
| Example 4 | — | 100 |
| Example 5 | — | 100 |
| Example 6 | — | 100 |
| Example 7 | 5.6 | 95 |
| Comparative Example 1 | 4.9 | 85 |
| Comparative Example 2 | 5.0 | 93.2 |
| Comparative Example 3 | 4.6 | — |

Referring to Table 3, since the lithium secondary batteries prepared in Examples 1 to 3 and 7 using the thermosetting electrolyte compositions of the present invention had an oxidation initiation voltage of about 5.3 V or more, it was confirmed that the lithium secondary batteries prepared in Examples 1 to 3 and 7 exhibited excellent electrochemical (oxidation) stabilities. In contrast, with respect to the secondary batteries of Comparative Examples 1 and 2, which used the thermosetting electrolyte compositions including one of the polymers containing the unit represented by Formula 2 or 3, and the secondary battery of Comparative Example 3 which included the non-aqueous electrolyte solution not containing a polymer, it may be understood that oxidation initiation voltages were about 5.0 V or less, which was lower than those of the secondary batteries prepared in Examples 1 to 3.

Also, referring to Table 3, initial discharge capacities (0.5C) of the lithium secondary batteries of Examples 1 to 7, which used the thermosetting electrolyte compositions including the polymers containing the unit represented by Formula 1 of the present invention, were about 95 mAh/g or more, but initial discharge capacities (0.5C) of the secondary batteries of Comparative Examples 1 and 2, which used the thermosetting electrolyte compositions including one of the polymers containing the unit represented by Formula 2 or 3, were 85 mAh/g and 93.2 mAh/g, respectively, wherein it may be understood that their initial discharge capacities were degraded in comparison to those of the lithium secondary batteries of Examples 1 to 7.

The invention claimed is:

1. A thermosetting electrolyte composition for a lithium secondary battery, comprising:
   a first lithium salt comprising $LiPF_6$,
   a second lithium salt which does not include $LiPF_6$,
   a non-aqueous organic solvent, and
   a polymer or oligomer containing a unit represented by Formula 1:

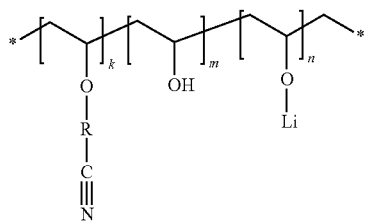

[Formula 1]

wherein, in Formula 1,
R is a substituted or unsubstituted alkylene group having 1 to 5 carbon atoms,
wherein k is a repeating unit having an integer of 10 to 15,000,
m is a repeating unit having an integer of 10 to 30,000, and
n is a repeating unit having an integer of 10 to 30,000.

2. The thermosetting electrolyte composition for a lithium secondary battery of claim 1, wherein the first lithium salt and the second lithium salt are included in a molar ratio of 1:0.01 to 1:50.

3. The thermosetting electrolyte composition for a lithium secondary battery of claim 1, wherein, in Formula 1,
R is a substituted or unsubstituted alkylene group having 1 to 3 carbon atoms,
k is an integer of 10 to 10,000,
m is an integer of 10 to 15,000, and
n is an integer of 10 to 15,000.

4. The thermosetting electrolyte composition for a lithium secondary battery of claim 1, wherein, in Formula 1,
R is —CH$_2$CH$_2$—,
k is an integer of 100 to 5,000,
m is an integer of 100 to 10,000, and
n is an integer of 500 to 10,000.

5. The thermosetting electrolyte composition for a lithium secondary battery of claim 1, wherein, in Formula 1,
a molar ratio of the repeating unit k to a sum of the repeating unit m and the repeating unit n is in a range of 1:0.001 to 1:1.

6. The thermosetting electrolyte composition for a lithium secondary battery of claim 5, wherein, in Formula 1,
a molar ratio of the repeating unit k to a sum of the repeating unit m and the repeating unit n is in a range of 1:0.01 to 1:1.

7. The thermosetting electrolyte composition for a lithium secondary battery of claim 5, wherein, in Formula 1,
a molar ratio of the repeating unit m to the repeating unit n is in a range of 1:0.1 to 1:10.

8. The thermosetting electrolyte composition for a lithium secondary battery of claim 1, wherein the polymer or oligomer containing the unit represented by Formula 1 is included in an amount of 0.1 wt % to 20 wt % based on a total weight of the thermosetting electrolyte composition.

9. A gel polymer electrolyte for a lithium secondary battery prepared by a thermal polymerization of the thermosetting electrolyte composition of claim 1.

10. A lithium secondary battery comprising the gel polymer electrolyte of claim 9.

* * * * *